Patented Feb. 19, 1924.

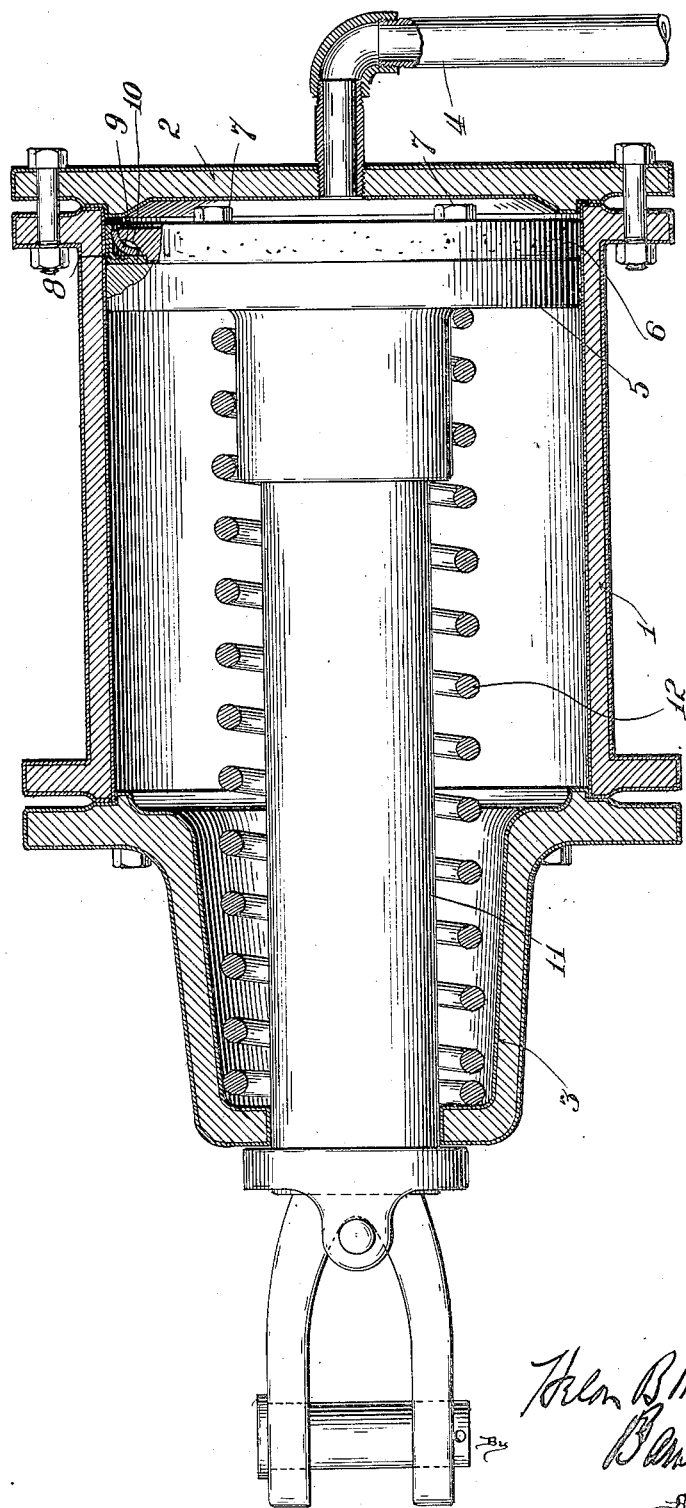

1,484,516

UNITED STATES PATENT OFFICE.

HELON B. MacFARLAND, OF CHICAGO, ILLINOIS, ASSIGNOR TO LEADIZING COMPANY, OF CHICAGO, ILLINOIS, A CORPORATION OF ILLINOIS.

BRAKE CYLINDER.

Application filed July 8, 1920. Serial No. 394,753.

*To all whom it may concern:*

Be it known that I, HELON B. MACFARLAND, a citizen of the United States, residing at Chicago, in the county of Cook and State of Illinois, have invented certain new and useful Improvements in Brake Cylinders, of which the following is a specification.

My invention relates to air brake apparatus for railway cars, and its object is to provide an improvement upon the brake cylinders, so-called, that is, the cylinders of the compressed air motors employed for operating the brake mechanism to apply the brake shoes to the wheels of the car.

It has been customary to make brake cylinders of cast iron and to provide the pistons thereof with leathers which, in order to prevent leakage so far as possible, are filled or covered with a lubricant. A brake cylinder is subjected to a pressure of about seventy pounds for freight service and from ninety to one hundred and ten pounds for passenger cars, and the efficiency and economy of operation of the brakes will necessarily depend upon the capacity of the cylinders to hold such pressures as these. With the cast iron cylinders, which are now exclusively used, so far as I am aware, the leakage is considerable due to the fact that the inner surface of the cylinder is at best never perfectly smooth and is liable to rust. The roughness of the cylinder wall and the incrustation of oxids makes it impossible to have the leather fit very closely, besides which these conditions tend to rub off and dissipate the lubricant and wear down the leather unevenly, so that repeated lubrication of the leather and its frequent replacement is necessary. This means taking down the brake mechanism at relatively short intervals for inspection and repair, which involves a labor item of considerable magnitude. Besides this, the leakage under the very best of circumstances increases the operating expense of the brake system.

My invention contemplates applying to the inner wall of the cylinder a permanent lubricating coating or plating consisting preferably of lead or a metallic alloy made up largely of lead; and as it is very difficult to satisfactorily plate or coat cast iron with lead, or other like metal so that the plating will be adherent, homogeneous, non-porous and superficially smooth, I propose to make the cylinder, by preference of steel, which, if the proper method is followed, can be coated internally with lead to provide a permanent and otherwise satisfactory surface for the piston to work upon, which makes it possible to obtain a closer fit between the piston and the cylinder, to minimize wear upon the piston leather, or other packing device, and to prevent the dissipation of the lubricant used on the leather where such lubricant is employed. With a cylinder constructed in accordance with my invention the need of lubricating the leathers is less than with the common type of brake cylinder.

The annexed drawing shows, in longitudinal section, a brake cylinder and associated parts, the cylinder being treated in accordance with my invention.

1 designates the body of the cylinder and 2 and 3 the cylinder heads, the air supply pipe 4 extending through head 2. The piston, which may be of any desired construction, is shown as made up of two discs 5 and 6 secured together by bolts 7, a leather 8 being clamped between the discs. 9 represents a flexible clamping ring which is arranged against the leather and within a groove 10 formed in the outer plate 6. 11 is the piston rod or stem, and 12 the spring which tends to force the piston against head 2 when relieved of the air pressure. The interior surface of the cylinder is covered with a lead plating 13. The other surfaces of the cylinder and its heads may be similarly plated, if desired, to prevent rusting, but this is incidental.

The cylinder 1 is preferably made of steel. It can be satisfactorily fabricated by die casting, after which the interior surface will be machined.

The plating operation is accomplished as follows: The cylinder is first cleaned to remove oxids by pickling in an acid, preferably muriatic acid. It is then passed into a body of molten lead, or an alloy of lead, through a flux which floats upon the lead and consists either of zinc chloride alone or a mixture of zinc chloride and common salt. I have found it advantageous to use a flux consisting of 80% by weight, of zinc chloride and 20% of common salt. It is also possible to use a flux consisting of 80% of zinc chloride, 15% of common salt and 5% of tin chloride, the tin chloride in the mixture serving to make the metal flow somewhat more freely over the surface of the cylinder. The flux is confined in a restricted area on the surface of the lead bath and the cylinder is removed from the bath at a point outside of this area.

The dipping process of lead plating above described involves, of course, the plating of the outside of the cylinder as well as the inside, but this is unobjectionable and, in fact, is advantageous, except so far as the cost of the lead is concerned, because the plating on the outside of the cylinder will prevent rusting.

Instead of employing the plating process above described the following may be used: The cylinder is immersed in a concentrated water solution of lead acetate to which is added, preferably, a small amount of acetic acid. The solution may contain 50% by weight, of the lead acetate, 5% acetic acid, and the balance water. The solution is heated to a temperature of approximately 212° Fahrenheit. At this temperature the lead acetate disassociates, producing deposition of the lead upon the surface to be plated. The solution may be built up from time to time by adding new lead acetate crystals. The coating produced by this treatment is ordinarily somewhat porous, and better results are obtained by subsequently submerging the cylinder thus plated in a bath of zinc chloride and common salt, preferably in the proportions of 80% by weight, of zinc chloride and 20%, by weight, of sodium chloride which is heated to approximately 650° Fahrenheit. At this temperature the lead plating dissolves superficially and commences to flow, with the result that the plating becomes homogeneous and non-porous.

While it is decidedly preferable to use steel instead of iron cylinders, for the reasons above stated, it is possible to obtain some of the advantages of my invention by lead plating cast iron cylinders. In such case, in order to make the plating adhere to the iron, the cylinder is first submerged in a bath of molten caustic alkali, preferably caustic soda, to which a small amount of borax may be added. The caustic alkali acts upon the silicon and graphite in the surface of the casting, apparently dissolving them out of the iron. The casting may then be plated with lead, by the dipping process above described, so as to give a fairly satisfactory surface for the piston to operate against, although the plating is not likely to be as permanent, smooth or non-porous as when the cylinder is made of steel.

The term "lead" as used in the claims is intended to cover not only pure lead but also common alloys of lead, such, for example, as alloys of lead and tin.

The invention is applicable to cylinders or working barrel tubes for use in mechanisms generally as well as in air brake apparatus.

So far as I am aware, I am the first in the art to provide a brake cylinder with a jacket or coating of lead formed on the inner face of the cylinder as distinguished from a jacket formed complete independently of the cylinder and then inserted into position. As will be appreciated, by the use of my improved construction, a perfect fit of the jacket within the cylinder is assured, and I have discovered by use of the device that satisfactory results are attained.

I claim:

1. A brake cylinder of steel having a jacket of lead formed within the cylinder on the side walls thereof.

2. The combination of a brake cylinder having a jacket of lead formed therein on its side walls, and a piston in said cylinder and having a peripheral facing of leather in sliding contact with the lead jacket.

3. As a new article of manufacture, a working barrel tube having upon the inner surface thereof a coating of a soft metal, substantially as and for the purpose set forth.

4. As a new article of manufacture, a working barrel tube having upon the inner surface thereof a soft metal coating comprising lead.

5. The method of finishing the interior surface of working barrel tubes, which consists of providing said surface with a coating of soft metal.

HELON B. MacFARLAND.